United States Patent [19]

Manber et al.

[11] 3,740,608

[45] June 19, 1973

[54] SCANNING CORRECTION METHODS AND SYSTEMS UTILIZING STORED DIGITAL CORRECTION VALUES

[75] Inventors: Solomon Manber, Sands Point; Michael J. McGovern, Huntington, both of N.Y.; Wesley E. Stupar, Granada Hills, Calif.

[73] Assignee: Alphanumeric Incorporated, Lake Success, N.Y.

[22] Filed: Aug. 18, 1970

[21] Appl. No.: 64,739

[52] U.S. Cl. .............................. 315/27 GD, 315/24

[51] Int. Cl. .............................. H01j 29/70

[58] Field of Search .................... 315/22, 24, 31 R, 315/27 GD

[56] References Cited

UNITED STATES PATENTS

| | | | |
|---|---|---|---|
| 3,435,278 | 3/1969 | Carlock et al. | 315/24 |
| 3,422,305 | 1/1969 | Infante | 315/31 R |
| 3,403,288 | 9/1968 | Bradley et al. | 315/22 |
| 3,403,289 | 9/1968 | Garry | 315/27 GD |

*Primary Examiner*—Carl D. Quarforth
*Assistant Examiner*—J. M. Potenza
*Attorney*—Hane, Baxley & Spiecens

[57] ABSTRACT

There is disclosed a method and several embodiments of apparatus for the correction of pin-cushion and other distortions in a cathode-ray tube wherein there are stored digital correction values associated with particular regions of the tube. As these regions are called for the associated correction values are used to modify the electron-beam deflection, focus, and intensity signals.

5 Claims, 5 Drawing Figures

INVENTORS
SOLOMON MANBER
MICHAEL J. McGOVERN
BY WESLEY E. STUPAR
Hane, Baxley and Spiecens
ATTORNEYS

SCANNING CORRECTION METHODS AND SYSTEMS UTILIZING STORED DIGITAL CORRECTION VALUES

This invention pertains to scanning systems and, more particularly, to such systems wherein a beam of electromagnetic energy is controllably deflected to scan a surface member.

Scanning systems have many applications. Two of the more common applications are associated with pattern recognition such as optical character readers, and graphics generation such as visual display devices.

The most common scanning associated with each of these applications comprises a cathode-ray tube system. In such a system an electron beam is controllably deflected to scan the screen of cathode-ray tube in a given pattern or raster. Because, the screen of the cathode-ray tube is substantially flat and since the electron beam sweeps out arcs during its deflection, well known pin-cushion distortion occurs in the pattern traced out by the electron beam. Heretofore, the more common solutions either employed permanent magnets located about the border of the tube or employed diode function generators to modify the deflection signals. The magnet solution can be used to improve the overall picture quality in spite of the fact that it introduces highly distorted regions in localized small areas of the picture. The diode function generator solution has been used in high-speed graphic arts quality character generators. In these latter systems, pin-cushion distortion has been effectively eliminated but at a very high price. In order to obtain the picture quality many break points must be used for the function. Associated with each break point is a specific voltage. Each of these specific voltages must be tightly controlled. Consequently, highly regulated power supplies, many operational amplifiers and very precise potentiometers are required. In addition, skilled technicians must carefully adjust the voltage levels and maintain these levels during the life of the equipment. Since many analog signals are used, frequent adjustments must be made because of drift.

The description up to this point has solely been directed to the geometrical pin-cushion distortion resulting from the inherent geometry of the cathode-ray tube. However, it should be apparent that there are other sources of picture distortion arising from the nonlinearity of the deflection means such as yokes. Furthermore, if the pattern on the screen of the tube is focused by an optical system onto a recording medium, which is the usual case, the optical system can introduce further distortion unless very high quality lenses are used.

While only a cathode-ray tube system with the electron beam being the beam of electromagnetic energy has been discussed, it should be apparent that the same distortions would arise with light beam scanners or electrostatically charged ink particle recorders and the like.

It is, therefore, a general object of the invention to provide improved means for minimizing the distortion which occurs when a beam scans a surface member.

It is another object of the invention to provide relatively inexpensive means for minimizing pin-cushion distortion and the like in apparatus wherein a controllably deflectable beam of electromagnetic energy scans a substantially flat surface member.

Briefly, the invention contemplates a scanning beam of electromagnetic energy which scans a surface member. There are means for deflecting the scanning beam to impinge on the surface member at a point displaced from a reference point on the surface member. A plurality of correction values are stored. Each of these stored correction values is associated with a particular displacement from the reference point on the surface member. In addition, there is means for generating deflection values associated with desired displacements from the reference point. Means modify the deflection values with the correction value associated with a desired displacement to form a modified deflection value which is then converted to a deflection signal for deflecting the scanning beam.

Other objects, the features and advantages of the invention will be apparent from the following detailed description when read with the accompanying drawing which shows apparatus for practicing the invention.

Figure 1:
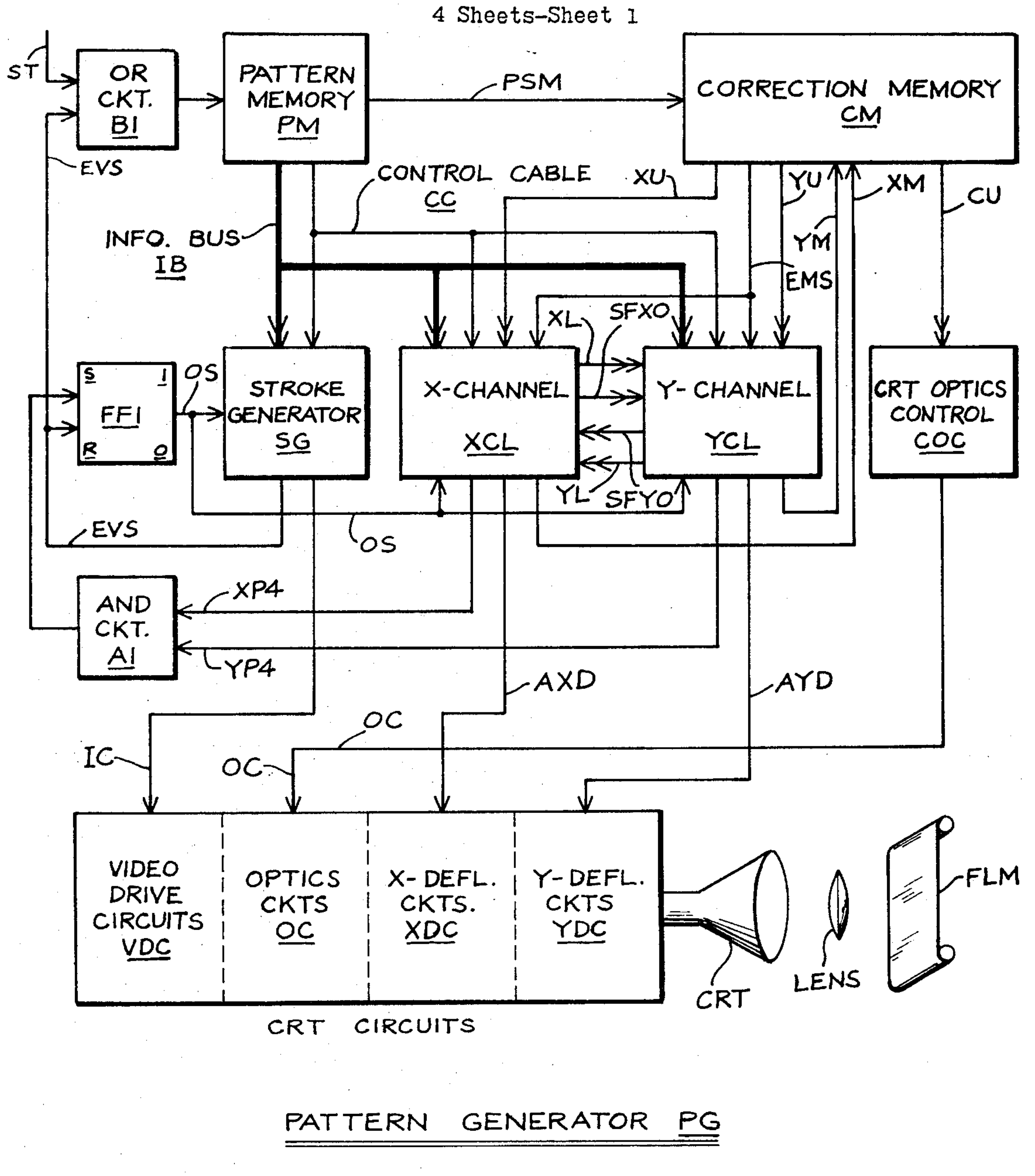
FIG. 1 is a block diagram of a pattern generator utilizing the invention.

In known systems, a pattern generator records symbols, displayed on the screen of a cathode-ray tube and projected by an optical system on a photographic film. In the pattern generator, the patterns are constructed by intensity modulating the vertical strokes of a raster. The raster is generated by horizontal deflection signals fed to the horizontal deflection circuits in a cathode-ray tube system and vertical deflection fed to the vertical deflection circuits of the system. During each vertical stroke of the raster, a stroke generator feeds an on-off signal, to the intensity control ("Z-axis") of the cathode-ray tube system.

Typically, at the end of a vertical stroke, a vertical deflection channel transmits a pulse to a horizontal deflection channel which changes the amplitude of an analog signal to horizontally deflect the electron beam by at least one column. A vertical deflection channel then feeds the equivalent of one cycle of a sawtooth waveform signal to the vertical deflection circuits and feeds pulse count signals to stroke generator. The stroke generator compares these pulse count signals with stored counts to control the turn-on and the turn-off time of the electron beam during the stroke. Since the present invention is not directly concerned with the actual generation of the characters, no further details of the stroke generator 24 will be discussed. A more detailed discussion of these portions of the pattern generator can be found in U.S. Pat. No. 3,471,848 issued Oct. 7, 1969.

Consider now the horizontal deflection system. Ideally, the horizontal diameter of the screen of the cathode-ray tube can be divided into a number of equal segments. Then, the analog signal can be quantized into increments wherein each increment will deflect the electron beam to impinge on the screen displaced by a distance equal to the length of a segment. Thus, it is possible to set up a one-to-one correspondence between the amplitude of the analog signal and the points on the horizontal diameter of the screen. Generally, the analog deflection signal is obtained from a binary-coded combination of pulses representing digital numbers wherein each digital number represents a different horizontal coordinate on the horizontal diameter. These digital numbers are then converted to the analog deflection signals. Thus, there can be a one-to-one correspondence between a digital number and a line segment of the screen. When this correspondence is attempted it is found that as the beam is deflected more and more from the central axis, each quantum of deflection signal (or each unit increment of the digital number) causes the beam to impinge more than a unit distance from the previous point. This results in the well known pin-cushion distortion.

This distortion can be corrected in the following manner. Associated with each horizontal coordinate on the horizontal axis is a correction number (value). Thus, when a digital deflection number is generated which will be used to horizontally position the electron beam to the particular desired horizontal coordinate, the correction value is added or subtracted from the digital number to obtain a modified digital deflection number which is then converted to the analog deflection signal. Thus, the electron beam will impinge on the desired coordinate.

The correction numbers can be obtained by temporarily placing a coordinate scale along the horizontal diameter of the cathode-ray tube screen and then entering known digital numbers into the horizontal deflection channel. For each such digital number representing a desired coordinate, a microscope reading is taken of the actual coordinate where the electron beam impinges. The difference between the actual coordinate and the desired coordinate is the correction value which must be used for that desired coordinate.

The above disclosed pattern generator can be primarily employed when a writing area is centered on the horizontal diameter of the cathode-ray tube and extends only slightly above and below the horizontal diameter. While such a writing area has been used successfully to generate characters, a line at a time, for exposure onto a moving film, there is also the need for pattern generators which can generate a page of pattern at a time. With such pattern generators it is necessary to correct for both horizontal and vertical pin cushion distortion. In such a case, one cannot merely have a set of horizontal correction values which correct the horizontal defection as a function of only horizontal position and a similar set of vertical correction values to correct the vertical deflection as a function of vertical position, since the horizontal position also affects the vertical pin cushion distortion and vice-versa. Therefore, it is now necessary to store a set of correction values which are simultaneous functions of both the horizontal and vertical position of the electron beam. In addition, corrections must be continuously made as the electron beam sweeps each stroke while generating the pattern.

Furthermore, it has been found that the electron beam optics of the cathode-ray tube vary with the deflections and thus the focus and intensity of the electron beam, for example, are dependent on the instantaneous position of the beam. Thus, in order to correct for these effects there is provided the more versatile pattern generator PG of FIG. 1.

For this preferred embodiment it will be assumed that the writing area will cover a square region of the screen or face of the cathode-ray tube. The square region will be centered on the major axis of the cathode-ray tube and be defined by a 4096 by 4096 coordinate system. In such a system it will be assumed that the horizontal or X-coordinates start at the left side of the square and increase to the right, and that the vertical or Y-coordinates start at the top of the square and proceed to the bottom. In addition, for the sake of simplicity, it will be assumed that the patterns are lines of characters written serially for left-to-right a line at a time from top to bottom.

Now, ideally at each point on the coordinate system it would be desirable to know all the actual correction numbers and to use these actual numbers to perform the corrections. Normally, the correction numbers are obtained as heretofore described by placing a coordinate scale over the screen of the cathode-ray tube and entiring desired coordinate numbers (XCMD and YCMD numbers) into the system to generate the deflection signals to deflect the electron beam to the desired position. By using a microscope one then notes the actual position of the electron beam in both the X and Y directions. The differences between the actual X- and Y- coordinates and the desired X- and Y- coordinates represented by the XCMD and YCMD numbers become the X and Y correction numbers for that pair of desired coordinates. Similarly one can measure the intensity and focus of the electron beam at that point and determine by how much they deviate from desired values. These deviations can be converted into digitally coded intensity (CI) and focus (CF) values. Hence it is seen that at each point of the writing area there would be four correction values and since there are over 16 million such points the storage problem for these correction values becomes prohibitive. However, it has been found that the required corrections change slowly over localized regions. Therefore, it is desirable to measure the correction values at every 128th coordinate. Thus, the writing square is divided into 32 × 32 cardinal regions, each being a square of 128 segments on a side. Within each cardinal region, it will be assumed that the intensity and focus corrections are constant and equal to the correction values obtained by measurements made for the upper left hand corner of the cardinal region. As far as pin cushion correction numbers, one could take the same approach. However, in order to achieve a very high accuracy the following procedure is used. For any desired cardinal pair of coordinates, the X-correction number and the Y-correction number at that pair of coordinates are obtained. For example, the pair at the upper left of a cardinal region. Call these numbers XC and YC. Then, the correction numbers are obtained for the cardinal pair directly to the right of the desired cardinal pair i.e., the pair at the upper right corner of the cardinal region. Call these numbers XCR and YCR. Then, the correction numbers are obtained for the cardinal pair diagonally opposite the desired cardinal pair, i.e., the pair at the lower right hand corner of the cardinal region. Call these numbers XCD and YCD. Now based, on the assumption that the pin cushion corrections vary monotonically and only slightly in each cardinal region the following further values are obtained. The slope of the change of the X-correction number across the cardinal region as a function of the change in the X-coordinate is obtained from the calculation (XC - XCR) divided by 128. This number will be called PXDX. The slope of the change of the X-correction number across the cardinal region as a function of the change in the Y-coordinate is obtained from the calculation XCD - XCR divided by 128. This number will be called PXDY. By similar calculations, one can obtain the number PYDY, the slope of the change in the Y-correction number across the cardinal region as a function of the change of the Y-coordinate, and the number PYDX, the slope of the change of the Y-correction number across the cardinal region as a function of the change of the X-coordinate. Thus, for each cardinal region which is identified by the X- and Y- coordinates of the upper left hand corner of the cardinal region there will be stored a correction word comprising the following values: XC, YC, PXDX, PXDY, PYDY, PYDX, CI and CF. Note that except for the numbers CI and CF the correction numbers can be positive or negative. Therefore, these numbers are stored with their sign.

In general, each time the electron beam is commanded to a new position by the XCMD and YCMD numbers, the cardinal region for that position is determined (merely by looking at the more significant positions of the XCMD and YCMD numbers, called the XM and YM numbers) and the stored correction word for that cardinal region will be read out to provide the correction numbers. The CI and CF numbers are used to adjust the intensity and focus for the cardinal region. The XC and YC values are used to perform gross pin cushion corrections for that cardinal region, ie, corrections to position the electron beam correctly with respect to the left and top edges of the cardinal region. The remaining values are used to fine correct the position of the electron beam for points within the cardinal region. For example, assume the desired position of the electron beam is XCMD = 140; YCMD = 130, i.e., the beam should be positioned in the cardinal region which is second from the left and second from the top of the array of cardinal regions and within the cardinal region the beam should be positioned 12, (140 − 128 = 12), segments to the right of the left edge and 2, (130 − 128 = 2) segments below the top edge. The first corrections that are performed are the gross corrections XCMD + XC = XDA and YCMD + YC = YDA. Then there are performed the fine corrections (XL) · (PXDX) + (YL) · (PXDY) and (YL) · (PYDY) + (XL) · (PYDX), where XL is the number of segments the beam is commanded to right of the left edge of the cardinal region and YL is the number of segments the beam is commanded below the top edge of the cardinal region. In the present example XL = 12 and YL = 2. After the gross and fine corrections has been performed the electron beam is at its true position for the start of a sweep. The sweep is triggered on and the electron beam modulated on and off to write a portion of the character. While the sweep is in progress further fine corrections are performed by appropriately modifying the X and Y sweeps in accordance with the local slope corrections. It will be assumed that the length of the sweep is such that the electron beam can enter only at most an adjacent cardinal region so that only minor errors are made in the corrections of the X and Y sweeps.

The pattern generator PG of FIG. 1 generates characters by causing the beam of the cathode-ray tube CRT to trace out a plurality of given length strokes each starting from a commanded point on the screen of the tube. During each stroke, the electron beam is binary-modulated (turned on and off) at indicated times. Since the screen of the cathode-ray tube CRT is projected by optical system LENS onto photographic film FLM, the patterns traced out by the cathode-ray tube are recorded on the film FLM.

More particularly, a typical recording cycle starts with the pattern memory PM, in response to a start signal ST, received via OR-circuit B1, transmitting via information bus IB, to stroke generator SG, X-channel XCL and Y-channel YCL under control signals on cable CC information concerning the next stroke. In particular, there is transmitted to stroke generator SG information concerning the times when the electron beam is to be on and off during the sweep. There is transmitted to X-channel XCL and Y-channel YCL information related to the desired X- and Y-coordinates for the starting point of the sweep and scale factors for controlling the lengths of X and Y components of the sweep. In response to the loading of the information related to the starting point, the X-channel XCL and the Y-channel YCL transmit information (the XM and YM numbers), via the lines XM and YM, respectively, to correction memory CM. The information indicates in which cardinal region the starting point is located and specifies an address in the correction memory CM where the word containing the correction values for that cardinal region is stored.

The pattern memory PM then emits a pulse on line PSM which triggers correction memory CM for one fetch cycle. Pattern memory PM trnasmits portions of the located correction word to X-channel XCL via line XU, to Y-channel YCL via line YU and to CRT optics control COC via line CU. More specifically, X-channel XCL receives the numbers XC, PXDX and PXDY, the Y-channel YCL receives the numbers YC, PYDY and PYDX, and the optics control COC receives the numbers CI and CF for the cardinal region.

Optics control COC converts the CI and CF binary numbers to analog signals which are transmitted via lines of cable OC to the optic circuits OC of the cathode-ray tube circuits to adjust the intensity and focus of the electron beam for the present cardinal region.

At the end of the fetch cycle, correction memory CM transmits a pulse on line EMS to X-channel XCL and Y-channel YCL to initiate arithmetic cycles therein which use the received correction numbers to perform the above - indicated gross and fine corrections. When the corrections are completed in X-channel XCL, it transmits a signal on line XP4; and when the corrections are completed in Y-channel YCL, it transmits a signal on line YP4. The coincidence of the signals on lines XP4 and YP4 results in AND-circuit A1 transmitting a signal to the set input S of flip flop FF1 which starts transmitting a signal on line OS. The signal on line OS is fed to X-channel XCL and Y-channel YCL to initiate sweep signals. The sweep signal generated by X-channel XCL is added to the analog signal representing the corrected X-coordinate of the sweep starting point, i.e., XCMD+XC+(XL)· (PXDX)+(YL)· (PXDY) and the sum signal is fed via line AXD to the X-deflection circuits XDC of the cathode-ray tube. Similarly, the Y-channel YCL transmits a sum signal, via line AYD, to the Y- deflection circuits YDC of the cathode-ray tube. At the same time, the OS signal is fed to stroke generator SG to initiate a stroke cycle of fixed time. During the stroke cycle, the stroke generator SG utilizes the information received from pattern memory PM to generate a signal on line IC which is fed to video drive circuits VDC to binary-modulate the electron beam of the cathode-ray tube. At the end of the stroke cycle, stroke generator SG generates a pulse signal on line EVS which resets flip flop FF1 terminating the OS signal which ends the sweeps being generated by the X- and Y-channels. In addition, the EVS signal passes via OR-circuit B1 to start the next recording cycle.

The various elements of the pattern generator PG will now be described. Pattern memory PM can be any conventional memory which sequentially transmits binary coded words wherein the bits of the words are transmitted in parallel. A portion of the word represents information fed onto information bus IB and another portion represents control signals fed into the lines of control cable CC. Although in any high speed system the pattern memory PM would be part of a computer memory coupled to an I/O channel, a multichannel paper tape or magnetic tape reader could be used. In such case the reader is started stepping by a pulse from OR-circuit B1 and continues stepping until it senses the generation of the pulse on line PSM. The pulse from OR-circuit B1 could be used to set a flip flop and the pulse on line PSM could be used to reset the flip flop. As long as the flip flop is set a stepping motor would step the tape reader.

Correction memory CM can be a multiword addressable store such as a multiplane magnetic core memory wherein conventional address selection utilizes the XM and YM numbers to locate the desired word. The memory would include the usual chain of circuits to perform a fetch cycle which is initiated by a pulse on line PSM and which emits a pulse on line EMS at the end of the fetch cycle. In addition correction memory CM would include an output register which stores the selected correction word. Separate portions of the output register are connected to the cables of lines XU, YU and CU.

The stroke generator SG can be a device which receives and stores binary coded numbers representing the times during the sweep when the electron beam is turned on and off. In addition it includes a pulse counter driven by rigidly timed pulses. The pulse counter is turned on when the signal on line OS starts a d counts to a predetermined count when it generates a signal on line EVS. At that time the pulse counter is turned off and cleared. There are included in the stroke generator comparators which compare the stored binary coded numbers with the count in pulse counter and upon coincidences switch the level of the signal on line IC.

Since the present invention is not concerned with the actual generation of the strokes, all that need be known for the present is that a given period of time after the pulse counter is turned on it reaches a given count and transmits a pulse onto line EVS. The actual use of the comparisons between the counts in the counter and the stored binary coded values is shown in U.S. Pat. No. 3,471,848.

The cathode-ray tube circuits are the conventional circuits associated with a cathode-ray tube to intensity modulate the election beam, to apply deflection signals to the deflection coils of the yoke and to apply signals to the deflection coils of the yoke and to apply signals to the election optical elements of the electron gun to control intensity and focus.

Figure 2:
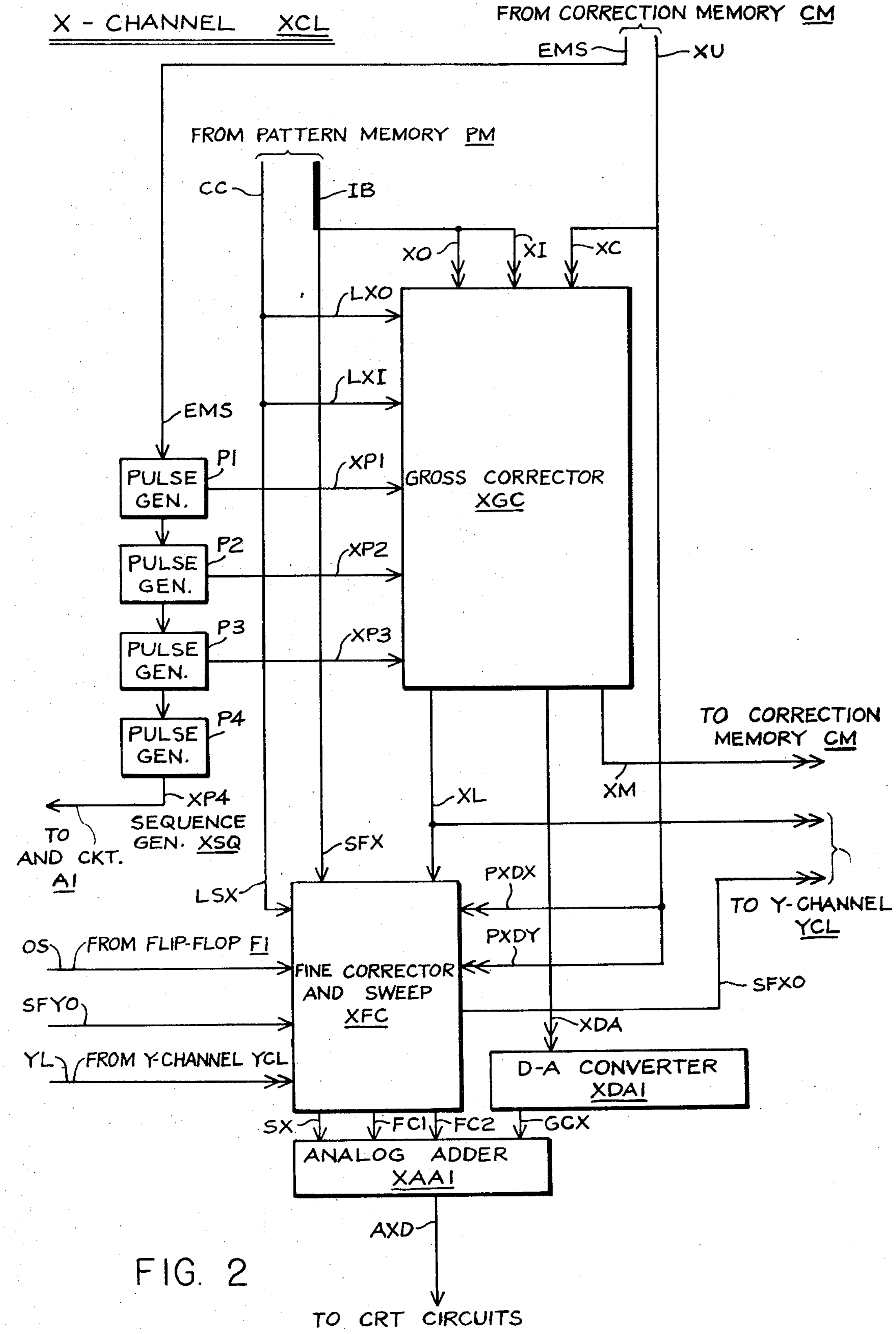
FIG. 2 is a block diagram of the X-channel of the pattern generator of FIG. 1.

Since the X-channel XCL and the Y-channel YCL are substantially identical only the X-channel will be described in detail. In FIG. 2 there is shown the overall block for the X-channel which comprises a gross corrector XGC, a sequence generator XSQ, a fine corrector and sweep XFC, a digital-to-analog converter XDA1 and an analog adder XAA1.

In general, the desired X-coordinate of the starting point of a sweep is received from pattern memory PM, via line XO or XI of bus IB, under control of signals on line LXO or LXI of control code CC. If there is to be a large change in the X-coordinate such as the starting of a new line of characters then the lines XO receive the binary number. If there is to be a small change in the X-coordinate, genually a unit increment, the lines XI receive the binary number.

In either event there is stored in a register of gross corrector XGC the XCMD number whose more significant portion is the X7 number which is fed to correction memory CM via lines XM and whose less significant portion is fed to Y-channel YCL via lines XL.

During the fetch cycle of correction memory CM, the XC number is received by gross corrector XGC from correction memory CM. At the end of the fetch cycle correction memory CM feds a pulse on line EMS to sequence generator XSQ. Sequence generator XSQ comprises four cascaded pulse generators P1 to P4. The pulse generators can be one-shot multivibrators which emit a pulse a given period of time after being triggered. The net effect is the generation of a pulse on each of the lines XP1 to XP4 wherein the pulses on the lines are spaced in time. The pulses on lines XP1 to XP3 sequence gross corrector XGC to perform the additions which result in the generator of the XDA number which is fed via lines XDA to digital-to-analog converter XDA1. Converter XDA1 converts this number to an analog signal on line GCX. The fine corrector and sweep XFC received a scale factor number which controls the length of the X-component of the sweep, via lines SFX of information bus IB under the control of the signal on line LSX, of control cable CC from pattern memory PM. Also, fine corrector and sweep SFC received the PXDX and PXDY numbers from correction memory CM during the fetch cycle, via lines of cable XU. In addition, fine corrector and sweep XFC is receiving the XL number from gross corrector XGC and the YL number from Y-channel YCL. In response, to these numbers the fine corrector and sweep, at the time following the pulse on line XP3, is generating an analog signal on line FC1 representing the portion of the fine correction (XL) · (PXDX), and an analog signal on line FC2 representing the portion of the fine correction (YL) · (PXDY). Analog adder XAA1 adds the signals on the lines FC1, FC2 and GCX so that the signal on line AXD, connected to the output of the adder represents the completely pin-cushioned corrected X-coordinate for the starting point of the sweep.

In response to the pulse on line XP4, it will be recalled, flip flop FF1 (FIG. 1) started generating the OS signal. When the OS signal is received by fine corrector and sweep XFC it starts generating a ramp waveform signal on line SX which is the X-component of the sweep. Analog adder XAA1 adds (superimposes) this sweep signal on line SX to the signals on lines FC1, FC2 and GCX to provide the total X-deflection signal on line AXD for the recording cycle.

Figure 3:
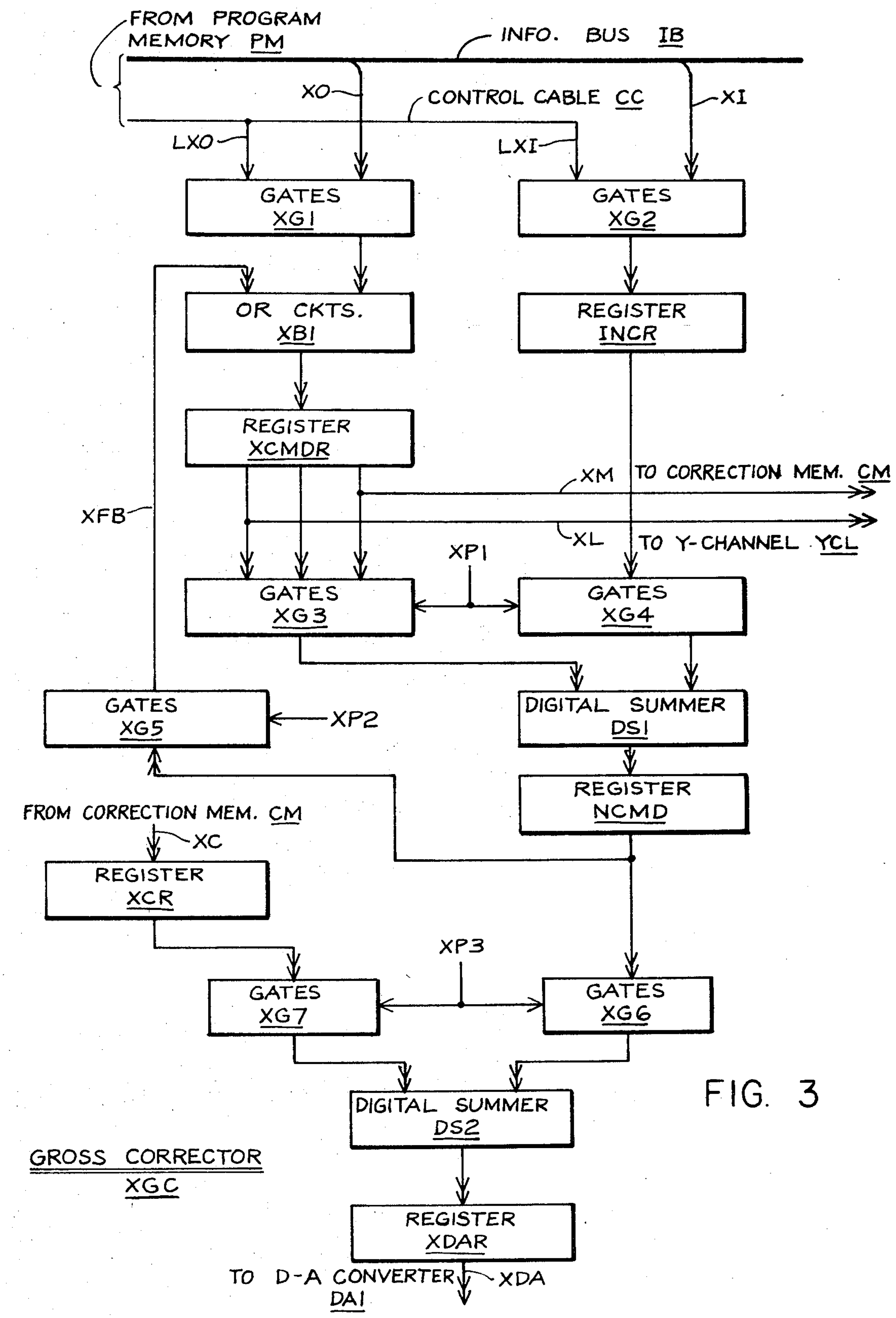
FIG. 3 is a block diagram of the gross corrector of the X-channel of FIG. 2.

The gross corrector XGC is shown in detail in FIG. 3. The initial X-coordinate at the start of a line of characters is loaded from program memory PM, via lines XO of information bus IB, gates XG1 and OR-circuits XB1 into register CMDR under control of a signal on line LXO of control cable CC. Gates XG1 can be a plurality of two-input and-gates wherein one input of each and-gate is connected to line LXO and the other input is connected to one of the lines XO. OR-circuits XB1 can be a plurality of two-input or-gates wherein one input of each or-gate is connected to an output of one of the and-gates of gates XG1 and the other input of each of the or-gates is connected to one of the lines of the cable XFB. Register XCMDR can be a multistage flip flop register which stores the XCMD number. After the initial loading of register XCMDR at the start of a line it will be assumed the X-coordinate is only incremented. The value of the increment for each record cycle is loaded into register INCR from program memory PM via lines XI of information bus IB and gates XG2 under control of a signal on line LXI of control cable CC. Gates XG2 can be a plurality of two-input and-gates wherein one input of each and-gate is connected to line LXI and the other input of each of the and-gates is connected to one of the lines XI. Register INCR is similar to register XCMDR except it has fewer stages and is connected to the outputs of gates XG2.

The outputs of register XCMDR are connected via gates XG3 to the original inputs of digital summer DS1. (It should also be noted that the most significant outputs of register XCMDR are connected via lines X7 to correction memory CM and that the least significant outputs are connected to lines XL.) The outputs of register INCR are connected via gates XG4 to the addend inputs of digital summer DS1. Gates XG3 and XG4 each comprise a plurality of two-input and-gates wherein one input of each and-gate of each plurality is connected to line XP1 and one input of each and-gate of the plurality associated with gates XG3 is connected to one output of register XCMDR and the other input of each of the and-gates associated with gates XG4 is connected to our output of register INCR. Digital summer DS1 can be a full parallel adder which performs the binary additions of two binary numbers. Thus, when a pulse is received on line XP1 digital summer DS1 performs the addition XCMD + XINC and stores the result in register NCMD whose inputs are connected to the outputs of summer DS1. Register NCMD can be similar to register XCMDR.

The outputs of register NCMD are connected via gates XG5 and OR-circuits XB1 to register XCMDR gates XG5 can be two-input and-gates wherein one input of each and-gate is connected to line XP2 and the other input of each and-gate is connected to one of the outputs of register NCMD. Thus, whenever a pulse is present on line XP2 the contents of register NCMD are loaded into register XCMDR to become the next XCMD number.

The outputs of register NCMD are also connected via gates XG6 to the addend inputs of digital summer DS2. Register XCR, which can be similar to register XCMDR but with fewer stages has its inputs connected via lines XC, to correction memory CM to receive therefrom the XC correction number. The outputs of register XCR are connected, via gates XG7, to the original inputs of digital summer DS2. Gates XG6 and XG7 are pluralities of two-input and-gates wherein one input of each and-gate is connected to line XP3 and the other input is connected to one of the outputs of registers XCR and NCMD. Digital summer DS2 can be a full parallel adder-substractor which adds or subtracts two binary numbers in accordance with the sign bit of the number stored in register XCR. Thus when a pulse is on line XP3, the algebraic sum of the XCMD and XC numbers is stored in register XDAR whose inputs are connected to the outputs of summer DS2. Register XDAR can be similar to register XCMDR except for the numbers of stages. The outputs of register XDAR are connected via lines XDA to digital-to-analog converter DA1.

Figure 4:
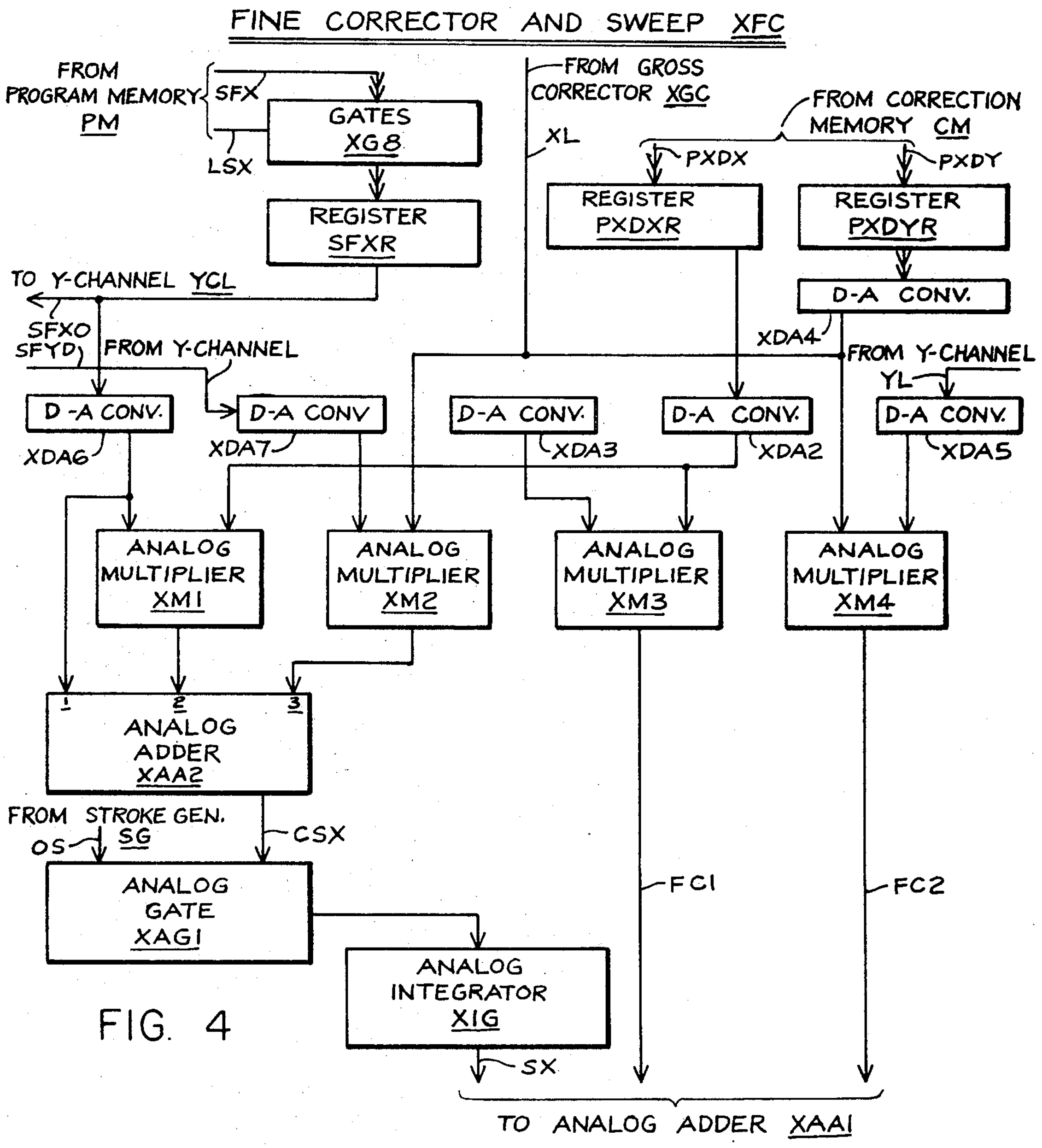
FIG. 4 is a block diagram of the fine corrector and sweep of the X-channel of FIG. 2.

The fine corrector and sweep XFC shown in FIG. 4 can be logically divided into the fine corrector circuits which generate the fine pin cushion correction signals on lines FC1 and FC2 and the sweep circuits which generate the sweep signal on line SX.

The fine corrector circuits comprise the register PXDXR, which is loaded by the signals on lines PXDX from correction memory CM. The digital outputs of register PXDXR are converted to an analog signal by digital-to-analog converter XDA2 and fed to the multiplicand input of analog multiplier XM3. At the same time the digital signals on lines XL from gross corrector XGC are converted to an analog signal by digital-to-analog converter XDA3 and fed to the multiplier input of analog multiplier XM3. Thus, the signal on line FC1, connected to the output of multiplier XM3, represents the produce (XL) · (PXDX). Similarly, the register PXDYR receives and stores the PXDY number on the lines PXDY from correction memory CM. The PXDY digital number stored in register PXDYR is converted to an analog signal equivalent by digital-to-analog converter XDA4 which is connected to the multiplicand input of analog multiplier XM4. The YL number received from Y-channel YCL is converted to an analog signal equivalent by digital-to-analog converter XDA5 and fed to the analog multiplier XM4. Multiplier XM4 multiplies the two signals and transmits onto line FC2 an analog signal representing the product of (YL) ·(PXDY).

The sweep signal, since it is deflecting the electron beam during a sweep is constantly changing the X-coordinate, must include a pin cushion correction factor. In addition, in order to be able to change the aspect ratio and the slant of the characters a scale factor is introduced into the sweep. For example, the height of a character can be doubled merely by introducing a scale factor of two for the X-component of the sweep. Now, it has been found that to provide a pin cushion corrected sweep in the X direction the aim voltage of the X-sweep CSX should equal SFX + (SFX) ·(PXDX) + (SFY) ·(PXDY) where SFX and SFY are the scale factors for the X- and Y- sweeps respectively.

Accordingly, the sweep circuits center around the analog adder XAA2 which sums three analog signals. The signals are obtained from the following circuitry. The scale factor SFX is loaded into register SFXR by the passage of signals on lines SFX through gates XG8 under control of the signal on line LSX from program memory PM. Gates XG8 are similar to gates XG2 and register SFXR is similar to register INCR of FIG. 9. The digital output of register SFXR is converted to an analog signal representation by digital-to-analog converter XDA6 and fed to the first input of adder XAA2. Thus the first input is the analog signal representing the number SFX. In addition, the output of digital-to-analog converter XDA6 is connected to the multiplier input of analog multiplier XM1 whose multiplicand input is connected to the output of digital-to-analog converter XDA2. Thus, the output of multiplier XM1 which is connected to the second input of adder XAA2 transmits on analog signal representation of the number (SFX) ·(PXDX). The third input to the adder XAA2 is connected to the output of analog multiplier XM2 whose multiplier input is connected via digital-to-analog converter XDA7 to lines SFYO from Y-channel YCL which carry the Y scale factor SFY. The multiplicand input of multiplier XM2 is the output of digital-to-analog converter XDA4. Thus, the signal fed to the third input of adder XAA2 is the analog representation of the number (SFY) (PXDY). Adder XAA2 analog sums the three input signals and transmits an analog sum signal on line CSX to the input of analog gate XAG1. The control input of gate XAG1 is connected to line OS from stroke generator SG. Thus the signal on line CSX, a constant amplitude signal, is only passed through the gate XAG1 during the presence of a signal on line OS. In this way a constant amplitude pulse signal is fed to analog integrator XIG which passes a ramp waveform signal to line SX. This signal is the X-component of the sweep voltage continuously corrected for pin cushion distortion.

Figure 5:
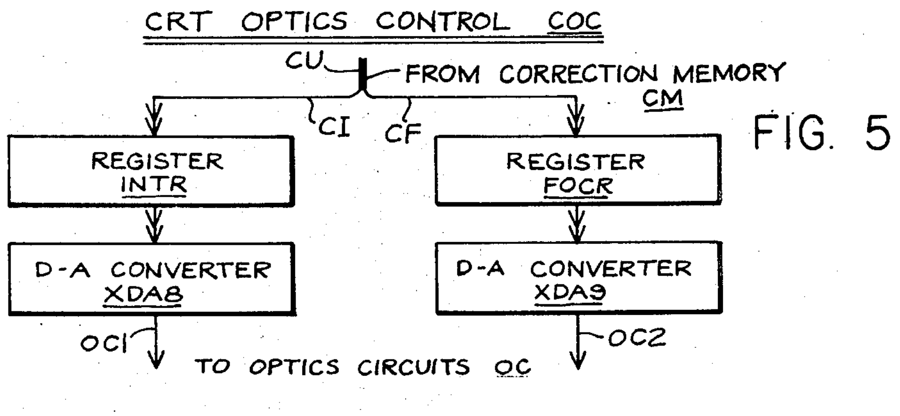
FIG. 5 is a block diagram of the CRT optics control of the pattern generator of FIG. 1.

The CRT optics control COC is shown in FIG. 5. Register INTR receives the digital number representing the required intensity for the cardinal region from lines CI in cable CU connected to correction memory CM. The digital number stored in register INTR is converted to an analog signal by digital-to-analog converter XDA8 and fed via line OC1 to the optic circuits OC. Register FOCR receives the digital number representing the required focus for the cardinal region from lines CF in cable CU connected to correction memory CM. The digital number stored in register FOCR is converted to an analog signal by digital-to-analog converter XDA9 and fed via line OC2 to optic circuits OC.

It should be noted that with the pattern generator of FIG. 1 no specific sizes were given for the registers nor were the number of binary positions given for numbers involved. The reason is that these values are determined by the desired accuracy for the corrections. For example, while it is true that the writing area is 4096 segments wide one could position to within a fraction of a segment. In addition in order to prevent an accumulation of tolerance errors the correction numbers are also expressed as an integer plus a fractional quantity with round offs being performed after the final addition.

It should also be noted that the position generator was shown with a continuous serial signal flow without multiplexing to simplify the teaching of the invention. Such a technique causes the use of extra components which would not be required in time sharing techniques. In the same vein, it should be realized that many of the digital arithmetic operations could be performed using analog operational amplifiers and digital-to-analog convertors and many of the analog operations could have been performed digitally. Furthermore, most of the arithmetic operations could be performed with a suitably programmed general purpose computer. The point to be recognized is that the exact final configuration will depend on trade offs between, speed, cost, desired accuracy, etc.

Since the other elements shown in the system are made up of standard components, and standard assemblies, reference may be had to "High Speed Computing Devices," by the Staff of Engineering Research Associates, Inc. McGraw-Hill Book Company, Inc., 1950); and appropriate chapters in "Computer Handbook" (Mc Graw-Hill, 1962) edited by Harvey D. Huskey and Granino A. Korn, and for detailed circuitry, to the example "Principles of Transistor Circuits," edited by Richard F. Shea, published by John Wiley and Sons, Inc., New York and Chapman and Hall, Ltd., London, 1953 and 1957. In addition, other references are: For system organization and components; Logic Design of Digital Computers," by M. Phister, Jr., (John Wiley and Sons, New York); "Arithmetic Operations in Digital Computers" by R. K. Richards (D. Van Nostrand Company, Inc., New York). For circuits and details: "Digital Computer Components and Circuits," by R. K. Richards (D. Van Nostrand Company, Inc., New York); "Pulse and Digital Circuits," by Millman and Taub (McGraw-Hill Book Company, Inc.).

Especially worthwhile books for finding the components mentioned in the disclosure as "off-the-shelf" items are "Digital Small Computer Handbook," "Digital Industrial Handbook" and "Digital Logic Handbook," 1967, 68 and 69 editions copyrighted in 1967, 1968 and 1969 by the Digital Equipment Corporation of Mayard, Massachusetts.

What is claimed:

1. A scanning system comprising a scanning beam of electromagnetic energy, a surface member to be scanned by said scanning beam, means for deflecting said scanning beam to impinge at a point on said surface member in accordance with the amplitude of a received deflection signal, means for storing a plurality of sets of correction values in digital form, each of said sets of correction values being associated with a different particular region of said surface member, means for generating a deflection value in digital form, associated with a desired point on said surface member, means responsive to the generated deflection value for selecting from said storing means the set of correction values of the particular region containing the desired point on said surface member, means for modifying the generated deflection value with at least some of the correction values of the selected set of correction values, and means for converting the so modified deflection value to a deflection signal which is transmitted to said deflecting means.

2. The scanning system of claim 1, wherein said deflecting means comprises first and second deflecting circuits for separately deflecting said beam in first and second directions, respectively, wherein each set of correction values includes subsets of correction values associated with said first and second directions, wherein said deflection value generating means simultaneously generates first and second deflection values associated with said first and second directions, respectively, wherein said modifying means utilizes correction values from each of said subsets to modify said first deflection value and different correction values from each of said subsets to modify said second deflection value, and wherein said converting means converts the first modified value to a first deflection signal for transmission to said first deflection circuit and converts the second modified value to a second deflection signal for transmission to said second deflection circuit.

3. The scanning signal of claim 1 further comprising sweeping means for controlling the beam to sweep a given distance in a given direction from the desired point and means utilizing some of said correction values for controlling said sweeping means to continuously modify the direction of the sweep of the beam during the time of the sweep.

4. The method of correcting distortions in a beam deflectable to different points on a surface member comprising the steps of recording and digitally storing digital values related to desired parameters of the beam at particular points on the surface member,at least one of said parameters being related to the intensity of the beam, generating digital deflection values for indicating the points to which the beam is to be deflected, deflecting the beam to a particular point indicated by one of said digital deflection values, selecting the digitally stored digital values associated with said particular point by utilizing said one digital deflection value and modifying the state of the beam in accordance with the selected digitally stored digital value.

5. The method of correcting distortions in a beam deflectable to different points on a surface member comprising the steps of recording and digitally storing digital values related to desired parameters of the beam at particular points on the surface member, at least one of said parameters being related to the focus of the beam, generating digital deflection values for indicating the points to which the beam is to be deflected, deflecting the beam to a particular point indicated by one of said digital deflection values, selecting the digitally stored digital values associated with said particular point by utilizing said one digital deflection value and modifying the state of the beam in accordance with the selected digitally stored digital value.

* * * * *